US012700684B2

(12) United States Patent  (10) Patent No.: US 12,700,684 B2
Polidori et al.  (45) Date of Patent: *Aug. 4, 2026

(54) COVER FOR HIGH VOLTAGE ELECTRICAL CONNECTOR

(71) Applicant: Burndy, LLC, Manchester, NH (US)

(72) Inventors: Nicholas Polidori, Medford, NJ (US); Jeremy Jushchyshyn, Willow Grove, PA (US)

(73) Assignee: Burndy, LLC, Manchester, NH (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/404,440

(22) Filed: Aug. 17, 2021

(65) Prior Publication Data

US 2021/0376499 A1 Dec. 2, 2021

Related U.S. Application Data

(63) Continuation of application No. 16/596,135, filed on Oct. 8, 2019, now Pat. No. 11,101,581.

(51) Int. Cl.
| | |
|---|---|
| *H01R 4/70* | (2006.01) |
| *H01R 43/00* | (2006.01) |
| *H02G 3/04* | (2006.01) |

(52) U.S. Cl.
CPC .............. *H01R 4/70* (2013.01); *H01R 43/00* (2013.01); *H02G 3/0418* (2013.01)

(58) Field of Classification Search
CPC ....................................................... H01R 4/70
USPC ....................................................... 439/625
See application file for complete search history.

(56) References Cited

U.S. PATENT DOCUMENTS

| | | | |
|---|---|---|---|
| 2,206,653 | A | 7/1940 | Yonkers |
| 3,147,338 | A | 9/1964 | Ekvall |
| 3,275,974 | A | 9/1966 | Mixon, Jr. |
| 3,491,331 | A | 1/1970 | Glader |
| 3,697,932 | A | 10/1972 | Keto et al. |

(Continued)

FOREIGN PATENT DOCUMENTS

| | | |
|---|---|---|
| CN | 204333315 | 5/2015 |
| CN | 109818189 | 5/2019 |

(Continued)

OTHER PUBLICATIONS

International Search Report and Written Opinion in corresponding International Application PCT/US2020/53097 mailed on Feb. 12, 2021 (11 pages).

(Continued)

*Primary Examiner* — Stanley Tso
(74) *Attorney, Agent, or Firm* — Wissing Miller LLP

(57) ABSTRACT

A locking mechanism particularly adapted to lock a cover of an electrical connector which connects an electrical transmission conductor to a distribution conductor. The locking mechanism includes a tip portion, a spiral portion, a holding portion, and an engagement portion, where the tip portion has a smaller cross-sectional area than the spiral portion and where the engagement portion is a widest portion of the locking mechanism. The present invention is also directed to a method of using the locking mechanism to lock the cover, as well as to a cover system which includes the locking mechanism and the cover engaged such that the cover is locked.

32 Claims, 5 Drawing Sheets

(56)             References Cited

U.S. PATENT DOCUMENTS

| | | | |
|---|---|---|---|
| 3,711,138 A * | 1/1973 | Davis | F16B 5/02 |
| | | | 411/409 |
| 3,960,431 A * | 6/1976 | MacKenzie | H01R 4/2416 |
| | | | 439/399 |
| 4,403,895 A | 9/1983 | Caldwell et al. | |
| 4,683,785 A | 8/1987 | Perraudin | |
| 4,829,298 A * | 5/1989 | Fernandes | G01R 15/26 |
| | | | 374/E1.019 |
| 5,378,101 A | 1/1995 | Olson | |
| 7,341,479 B2 | 3/2008 | Boutlin | |
| 10,431,930 B1 * | 10/2019 | Pearman | H02G 15/113 |
| 10,465,732 B2 | 11/2019 | Polidori | |
| 11,101,581 B2 | 8/2021 | Polidori et al. | |
| 2004/0068319 A1 | 4/2004 | Cordaro | |
| 2007/0142837 A1 | 6/2007 | Dreyfuss | |
| 2008/0112775 A1 | 5/2008 | Hsu | |
| 2008/0177307 A1 | 7/2008 | Moskowitz | |
| 2010/0048051 A1 | 2/2010 | Melni | |
| 2010/0124454 A1 * | 5/2010 | Yaworski | H02G 15/117 |
| | | | 403/23 |
| 2013/0023992 A1 | 1/2013 | Moskowitz | |
| 2014/0345938 A1 | 11/2014 | Royer | |
| 2016/0141801 A1 | 5/2016 | Siebens | |
| 2017/0033541 A1 | 2/2017 | McCallum | |
| 2018/0031795 A1 * | 2/2018 | Al Ghossein | G02B 6/483 |
| 2020/0006869 A1 * | 1/2020 | Newman | H02G 15/113 |
| 2021/0104826 A1 | 4/2021 | Polidori | |

FOREIGN PATENT DOCUMENTS

| | | | |
|---|---|---|---|
| EP | 1058343 | * | 5/2000 |
| FR | 2713291 | | 5/1995 |

OTHER PUBLICATIONS

International Preliminary Report on Patentability mailed in corresponding application PCT/US2020/53097 on Apr. 21, 2022 (9 pages).
Extended European Search Report in corresponding European Application 20875030.7 mailed on Oct. 6, 2023 (88 pages).
International Preliminary Report on Patentability in corresponding International Application PCT/US2020/53097 mailed on Apr. 21, 2022 (9 pages).
Examination Report in corresponding European Application No. 20875030.7 mailed Jan. 5, 2026. (5 pages).
Australian Examiner's Report No. 1 in corresponding Australian Application No. 2020364308 mailed May 26, 2025. (4 pages).
First Office Action in corresponding Chinese Application No. 202080077621.3 mailed May 16, 2026. (22 pages).
Office Action in corresponding Canadian Application No. 3,157,121 mailed Jun. 18, 2026. (6 pages).

* cited by examiner

COVER FOR HIGH VOLTAGE ELECTRICAL CONNECTOR

CROSS REFERENCE TO RELATED APPLICATIONS

This application is a continuation of application Ser. No. 16/596,135, filed Oct. 8, 2019 which is incorporated herein in its entirety by reference.

BACKGROUND OF THE INVENTION

The present invention is directed toward a cover for a high voltage electrical connector and, more particularly, toward a locking mechanism for such a cover, a method of using the locking mechanism, and a system including the locking mechanism.

Electrical distribution systems, especially high voltage electrical distribution systems, often require having an electrical transmission conductor and a distribution conductor. The distribution conductor may draw away some of the current from the electrical transmission conductor or it may feed current into the electrical transmission conductor, depending what is needed. Such operation requires an electrical connector to connect the two different conducting wires. Furthermore, because of the high voltages and associated safety issues, such electrical connectors must be covered with insulating covers (herein otherwise also referred to as "covers"). However, for safety purposes, it is desirable to have a way to lock the cover so that it stays on even in inclement weather as well as to be tamper-proof. Additionally, there is a need for a locking mechanism which is easy to use and does not require an operator to be too close to the cover to operate the locking mechanism due to the high voltage, and the present invention addresses all of these requirements, as more fully explained below.

SUMMARY OF THE INVENTION

The present invention is designed to address the needs for the locking mechanism as explained above. It is an object of the present invention to provide a locking mechanism which can be easily utilized to close a cover for a high voltage electrical connector.

It is another object of the present invention to provide such a locking mechanism that can be operated without an operator getting too close to the high voltage electrical connector.

It is yet another object of the present invention to provide such a locking mechanism that is robust and will maintain the cover for the high voltage electrical connector from opening even in inclement weather.

It is a further object of the present invention to provide such a locking mechanism that is tamper-proof.

In accordance with the illustrative embodiments demonstrating features and advantages of the present invention, there is provided a locking mechanism particularly adapted to lock a cover of a high voltage electrical connector for connecting an electrical transmission conductor to a distribution conductor. Such locking mechanism includes: a tip portion, a spiral portion, a holding portion, and an engagement portion, and the tip portion has a smaller cross-sectional area than the spiral portion and the engagement portion is a widest portion of the locking mechanism.

Furthermore, the present invention is also directed to a method of locking the cover of the high voltage electrical connector for connecting the electrical transmission conductor to the distribution conductor. Such method includes: inserting the tip portion of the locking mechanism into an opening of a first side of the cover, turning the locking mechanism such that the spiral portion enters the opening of the first side, inserting the tip portion of the locking mechanism into an opening of a second side of the cover, and turning the locking mechanism such that the spiral portion enters the opening of the second side.

In another aspect, the present invention is also directed to a cover system (otherwise also referred to as a "system") for the high voltage electrical connector. The electrical connector is operably connected to the electrical transmission conductor and the distribution conductor. The system for the electrical connector includes the cover for the electrical connector and the locking mechanism configured to lock the cover. The cover includes the first side and the second side, and they are positioned to cover and protect the electrical connector, and the first side and the second side are operably connected at one end.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figures 1A, 1B, 1C, 1D, 1E, 1F:
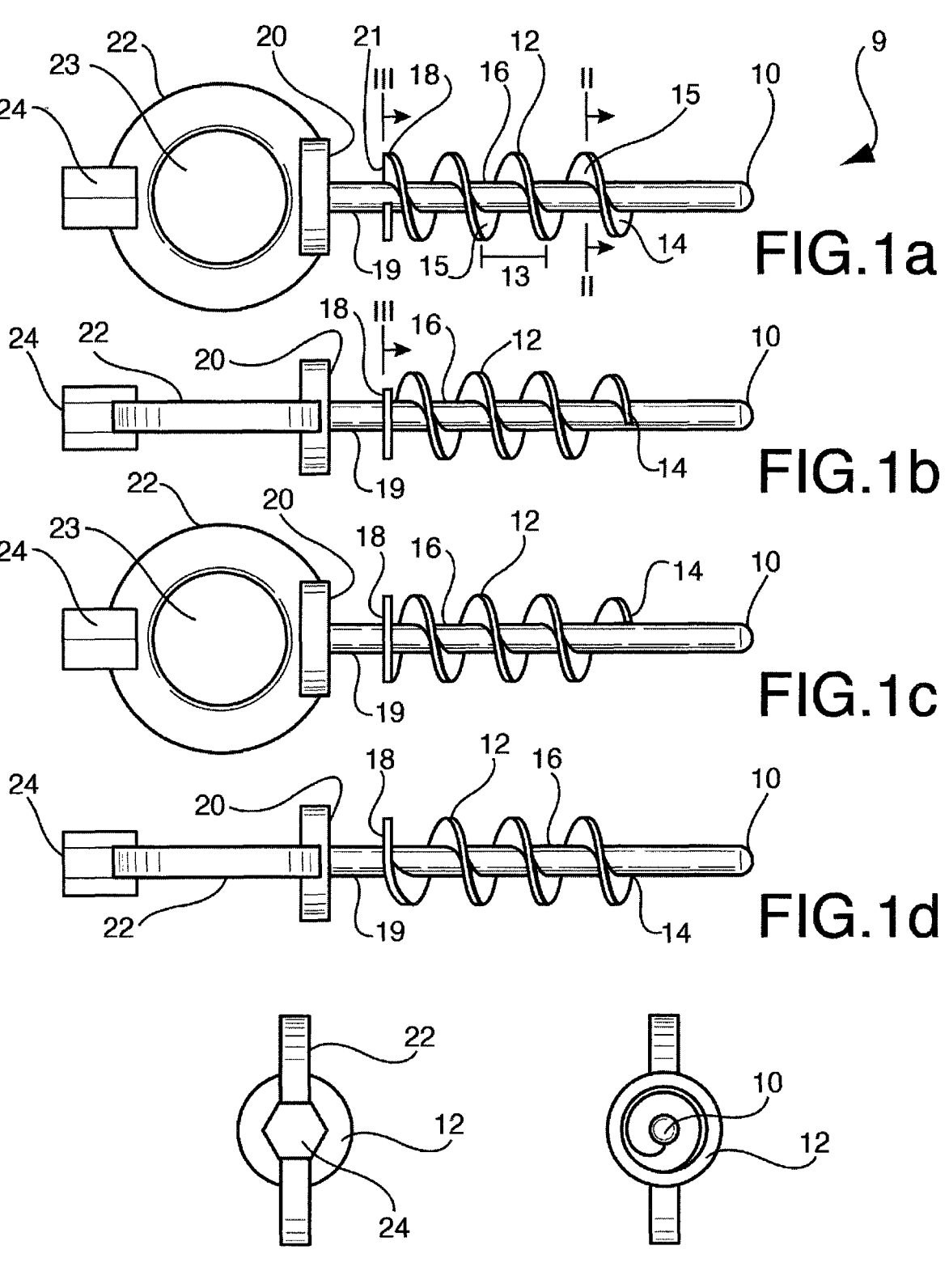
FIG. 1*a* is a side view of a locking mechanism in accordance with the present invention.
FIG. 1*b* is a side view of the locking mechanism shown at FIG. 1*a* which has been rotated 90° counter-clockwise relative to FIG. 1*a* where the axis of rotation extends left to right across the page.
FIG. 1*c* is a side view of the locking mechanism shown at FIG. 1*a* rotated a further 90° relative to FIG. 1*b;*
FIG. 1*d* is a side view of the locking mechanism shown at FIG. 1*a* rotated a further 90° relative to FIG. 1*c;*
FIG. 1*e* is a rear view the locking mechanism shown at FIG. 1*a;*
FIG. 1*f* is a front view of the locking mechanism shown at FIG. 1*a;*

The present invention is directed to a locking mechanism. Such locking mechanism is used to lock a cover on an electrical connector for high voltage applications. In the present application, an electrical connector for high voltage applications (otherwise referred to as a high voltage electrical connector) is deemed to be an electrical connector capable of operating under normal conditions under at least a voltage of 33 kilovolts, preferably at least 66 kilovolts, and more preferably at least 110 kilovolts, and an ampacity of at least 500 A, preferably at least 1000 A, and more preferably at least 1500 A. In other words, the high voltage electrical connector can operably connect two conductors, such as an electrical transmission conductor and a distribution conductor, which have the voltage differences identified above, and which results in the current transfer identified above. The present invention is also directed to a method of using the locking mechanism to lock the cover. Additionally, the present invention is directed to a system which includes the cover and the locking mechanism.

Referring now to the drawings in detail wherein like reference numerals have been used throughout the various figures to designate like elements, there is shown in FIGS. 1-4 a locking mechanism and system constructed in accordance with the principles of the present invention.

Figure 2:
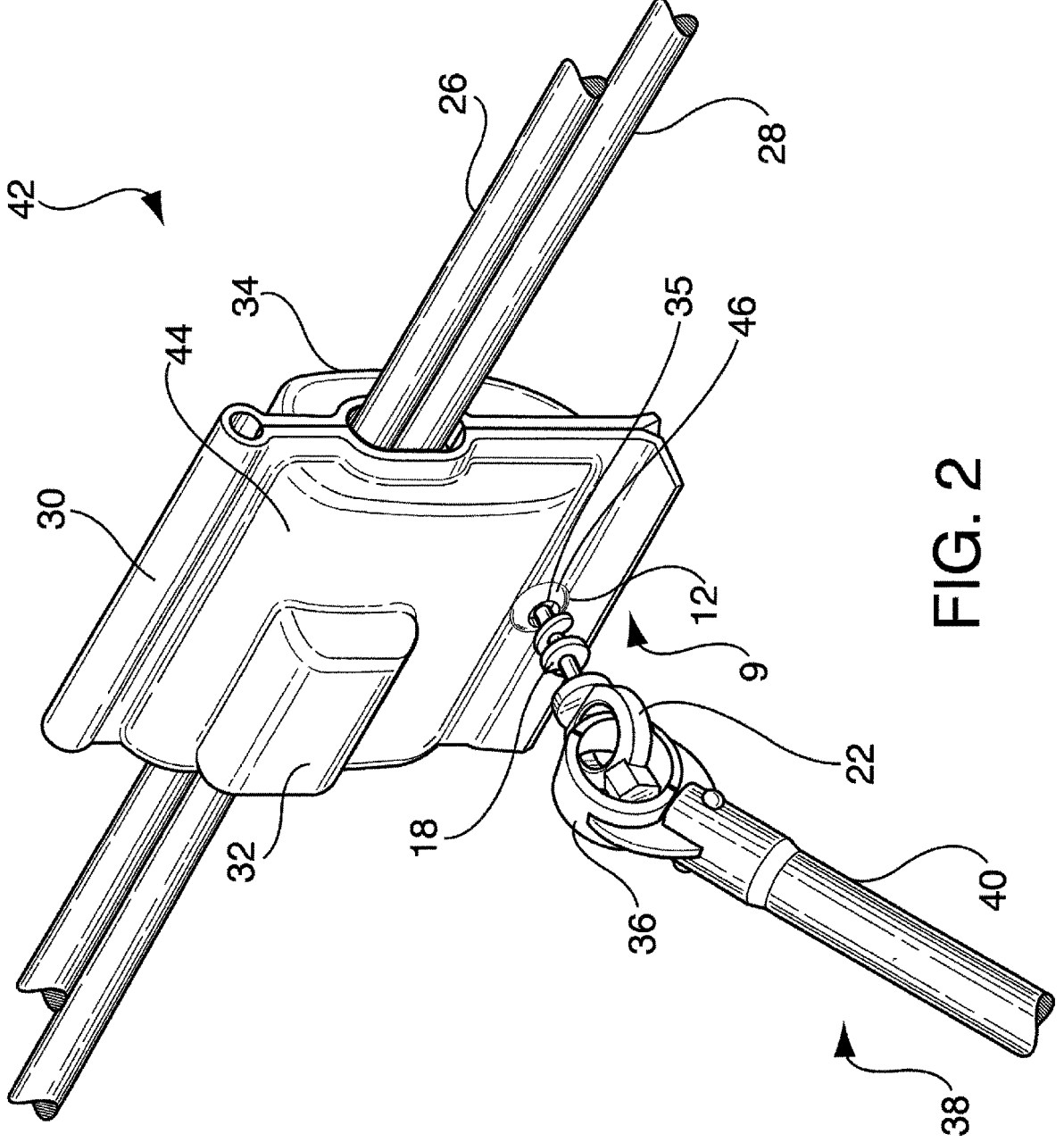
FIG. 2 is a side perspective view of a system according to the present invention.

In an aspect of the invention, FIGS. 1 and 2 show a locking mechanism 9 particularly adapted to lock a cover 44 for a high voltage electrical connector 29 (See FIG. 4) connecting an electrical transmission conductor 26 to a distribution conductor 28. Such electrical connectors are known in the art and no further explanation of such electrical connectors is necessary. U.S. Pat. No. 4,415,222 shows an example of an electrical connector and the disclosure of such patent is incorporated by reference herein in its entirety.

The locking mechanism 9 includes a tip portion 10, a spiral portion 12, a holding portion 19, and an engagement portion 22. The tip portion 10 has a smaller cross-sectional area (perpendicular to a longitudinal direction of the tip portion) than the spiral portion 12. The engagement portion 22 is a widest portion of the locking mechanism 9. The locking mechanism 9 also includes an axial portion 16. The tip portion 10 is part of the axial portion 16, and the axial portion 16 extends from the tip portion 10 through the holding portion 19. The spiral portion 12 is formed from a spiral-shaped flange which makes at least two complete turns around an outer surface of the axial portion 16 while extending at least partially between the tip portion 10 and the holding portion 19.

The spiral portion 12 has a first end 14 and a second end 18, and the first end 14 is configured to engage the cover 44 and to guide the movement of the cover 44 longitudinally along a first longitudinal direction of the axial portion 16 from the tip portion 10 to the holding portion 19, and the second end 18 is configured to engage the cover 44 and to hold the cover 44 from moving in a second longitudinal direction of the axial portion 16 which is opposite to the first longitudinal direction. Except for the second end 18, the spiral portion 12 continuously extends along, the first longitudinal direction and around the axial portion 16 such that any plane perpendicular to the first longitudinal direction which intersects the spiral portion 12 except for the second end 18 will intersect the spiral portion 12 along less than a 30 degree extension along the outer surface of the axial portion 16. Also, a plane perpendicular to the first longitudinal direction which intersects the second end 18 of the spiral portion 12 will intersect the spiral portion 12 along more than a 30 degree extension along the outer surface of the axial portion 16.

Figures 5A, 5B:
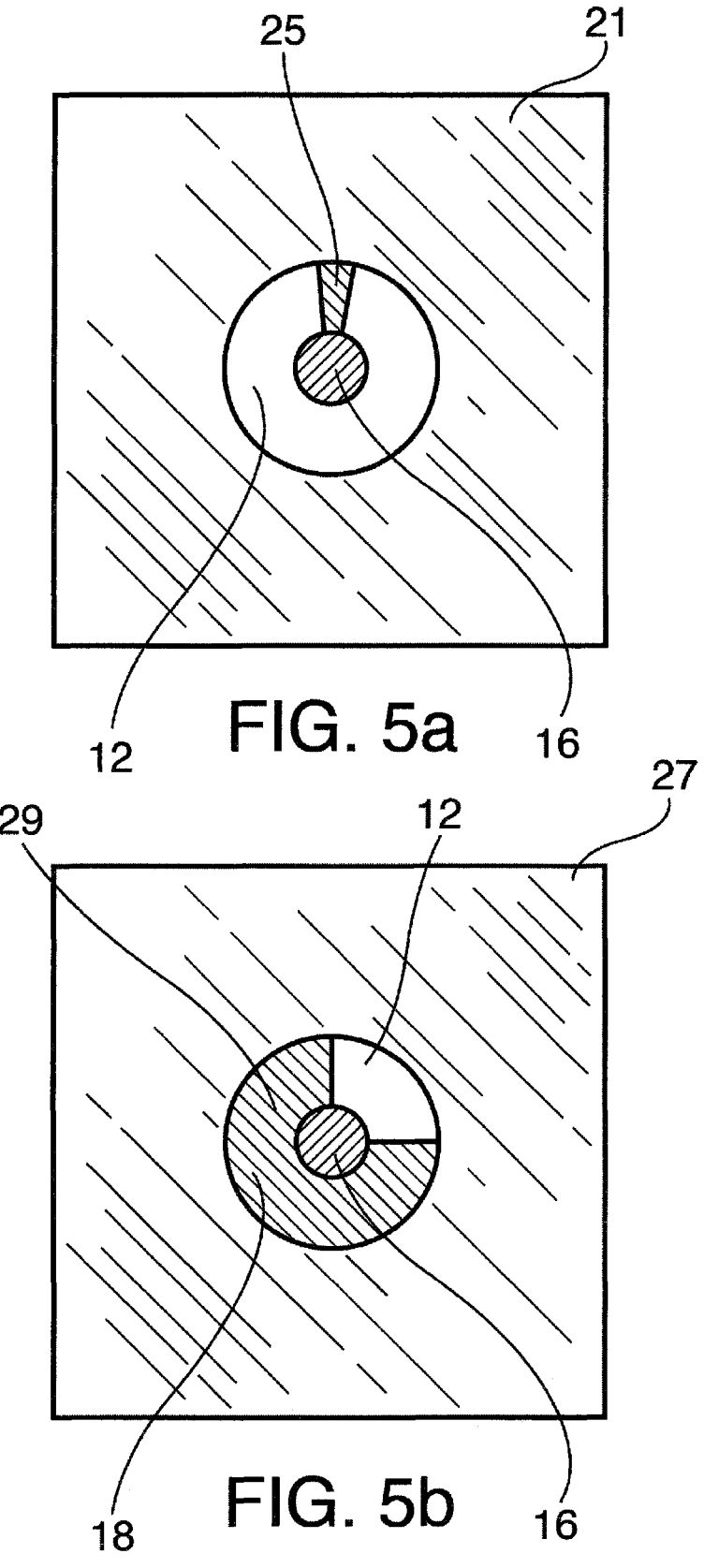
FIG. 5*a* is a cross sectional view taken through lines II-II of FIG. 1*a* and also showing a plane extending perpendicular the locking mechanism.
FIG. 5*b* is a cross sectional view taken through lines III-III of FIG. 1*a* and also showing a plane extending perpendicular the locking mechanism.

FIG. 5a shows a plane 21 perpendicular to the first longitudinal direction which intersects the spiral portion 12 except for the second end 18 and how it intersects the spiral portion 12 along less than a 30° extension along the outer surface of the axial portion 16. The reference numeral 25 is used to denote the intersection between the plane 21 and the spiral portion 12 along the outer surface of the axial portion 16. FIG. 5b shows a plane 27 perpendicular to the first longitudinal direction which intersects the second end 18 and how it intersects the second end 18 along more than a 30 degree extension along the outer surface of the axial portion 16. The reference numeral 29 is used to denote the intersection between the plane 27 and the second end 18 along the outer surface of the axial portion 16. At FIG. 5b, the second end 18 and the intersection 29 are coextensive.

In *an* embodiment, a substantial portion of the second end 18 extends in a direction substantially perpendicular to the first longitudinal direction. In other words, a substantial portion of the very edge (i.e., a terminal end portion 21) of the second end 18 extends in a direction substantially perpendicular to the first longitudinal direction and is essentially "flat". This is important since by extending perpendicular to the first longitudinal direction rather than extending at least partially along the longitudinal direction, the terminal end portion 21 (and, accordingly, the spiral portion 12) will not re-engage the cover 44 (or any of its sides 32, 34) once the cover 44 is located at the engagement portion 19, such that the cover 44 will reliably stay in the holding portion 19. In order to remove the cover 44 from the holding portion 19 requires breaking the locking mechanism 9 or the cover 44, or deforming the locking mechanism 9 or the cover 44 in a very specific way, which makes the locking mechanism 9 tamper-proof and resistant to inclement weather since there is no simple way to remove the cover 44 once it is locked in place by being in the holding portion 19.

The locking mechanism 9 has to be turned in order to connect with the cover 44. The engagement portion 22 defines an opening 23 through which the engagement portion 22 may be engaged to rotate the locking mechanism 9. The opening 23 may be circular or oval shaped or may have any other shape such as a quadrilateral shape. Also, the engagement portion 22 may be a widest portion of the locking mechanism 9 in a direction perpendicular to a line defined by the first longitudinal direction. The engagement portion 22 may be connected to a supporting end 20 and supporting end 20 helps hold the cover 44 in the holding portion 19. The supporting end 20 is connected to the axial portion 16. The engagement portion 22 may be integrally connected to an end part 24 which helps with stability, strength, and also can be used to carry or arrange the locking mechanism 9 in a rack since the end part 24 is wider than the engagement portion 22 in at least one dimension so the end part 24 can be used to support the locking mechanism 9 in such a rack, for example.

In another aspect, the present invention is directed to a method of locking the cover 44 of the electrical connector 29 with the locking mechanism 9 of the present invention. As stated above, the locking mechanism 9 may include the tip portion 10, the spiral portion 12, the holding portion 19, and the engagement portion 22, where the tip portion 10 has a smaller cross-sectional area than the spiral portion 12 and where the engagement portion 22 is a widest portion of the locking mechanism 9.

Figures 3A, 3B:
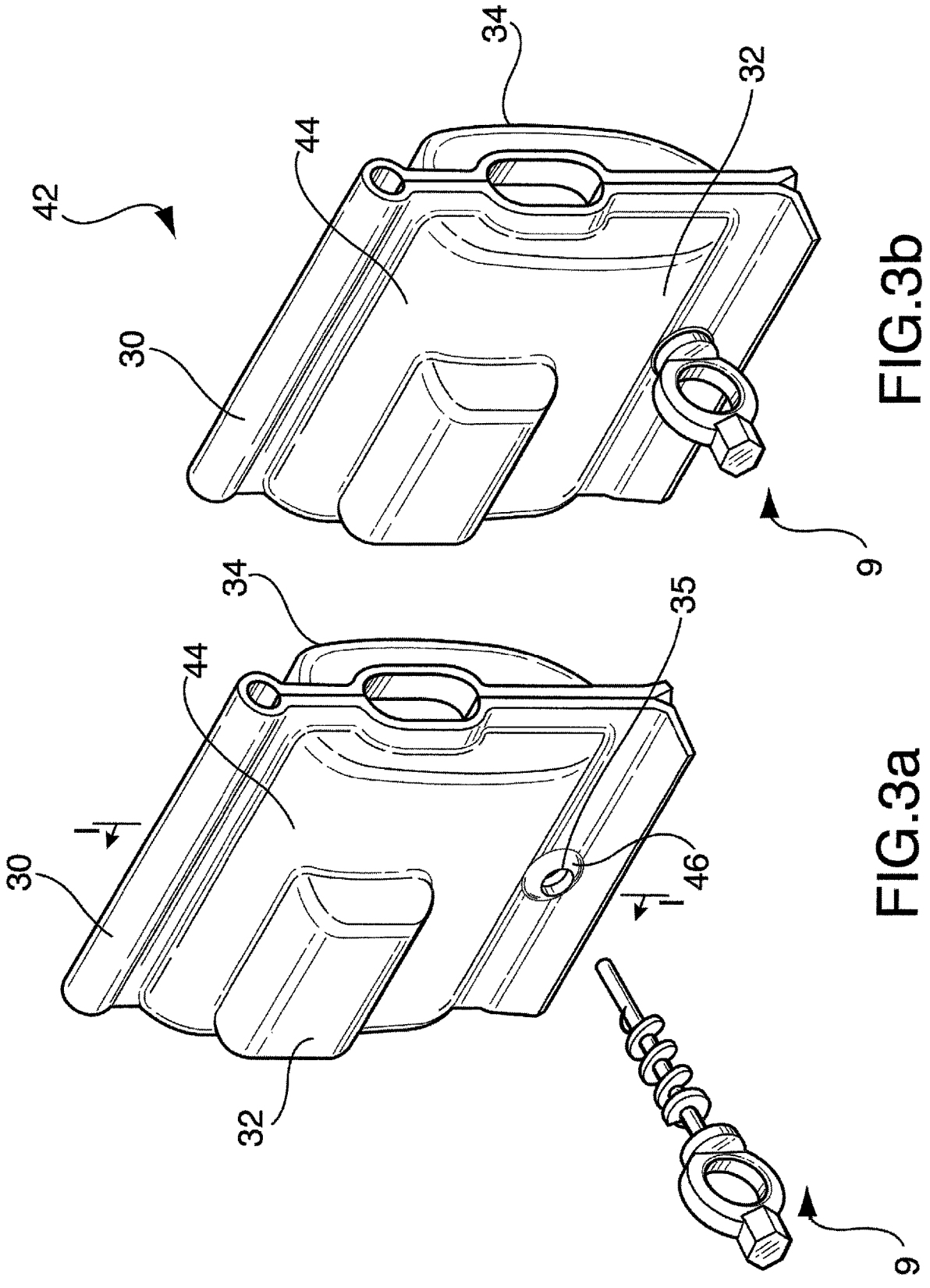
FIG. 3*a* is a side perspective view of the locking mechanism according to the present invention and the cover which it locks.
FIG. 3*b* is a side perspective view of the system according to the present invention.
Figure 4:
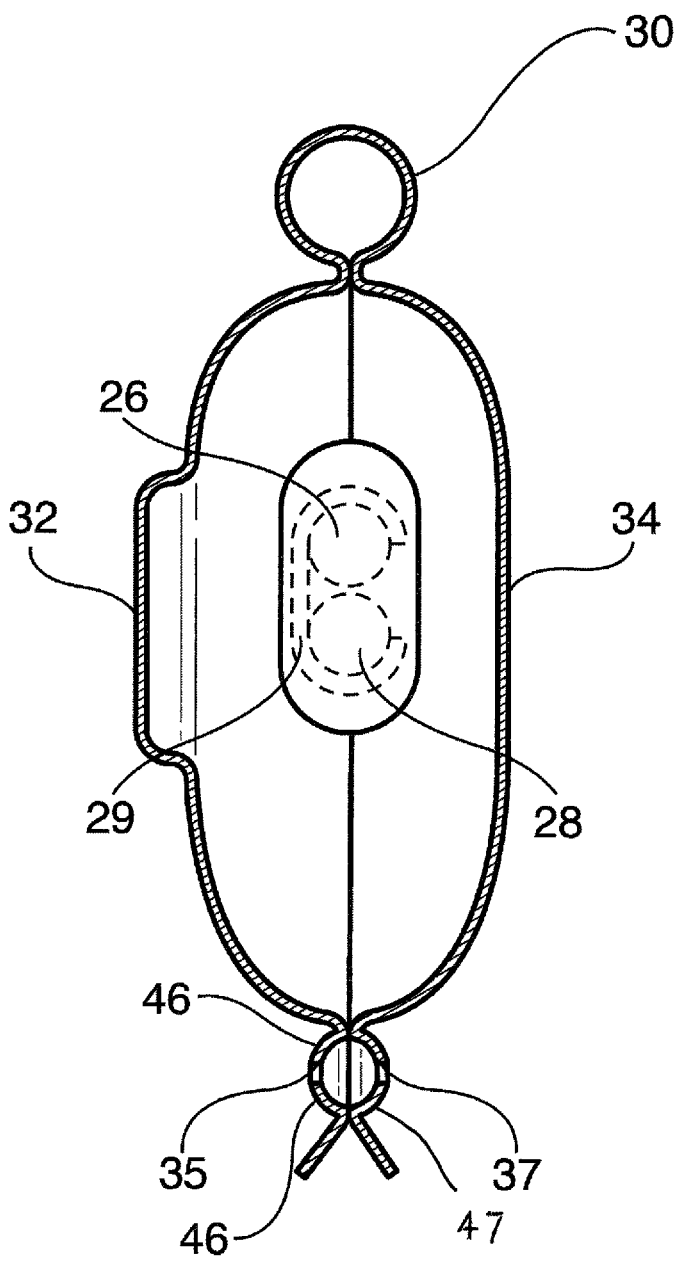
FIG. 4 is a cross sectional view taken through lines I-I of FIG. 3*a* and also showing the conductors and the electrical connector.

As shown at FIGS. 2, 3a and 3b, the method includes inserting the tip portion 10 of the locking mechanism 9 into an opening 35 of a first side 32 of the cover 44. Subsequently, the locking mechanism 9 is rotated such that the spiral portion enters the opening 35 of the first side 32. In FIG. 3a, the turning would be clockwise due to the way the spiral 12 is designed. Once the tip portion 10 has been inserted into the first side 32, if it continues moving in a same direction, it will reach the second side 34 of the cover 44. FIG. 4 shows opening 35 extending through the first side 32 of the cover 44 and opening 37 extending through the second side 34 of the cover 44 such that the tip portion 10 and the spiral 12 can enter the first side 32 and then the second side 34 via openings 35 and 37, respectively. Thus, the method includes inserting the tip portion 10 and the spiral portion 12 of the locking mechanism 9 into opening 35 and then into opening 37 of the cover 44. The method also includes turning the locking mechanism 9 such that the spiral portion 12 enters the openings 35, 37 of the first and second sides 32, 34 and to move the first and second sides 32, 34 along the spiral portion 12. In other words, as the spiral portion 12 engages the cover 44, the holding portion 19 may move towards the cover 44 and/or the cover 44 may move towards the holding portion 19.

After the tip portion 10 enters the opening 35 of the first side 32, the locking mechanism 9 can be turned such that the first side 32 moves along the spiral portion 12 until the first side 32 reaches the holding portion 19. FIG. 3b shows the first side 32 positioned inside the holding portion 19. Once the tip portion 32 enters the opening 37 of the second side 34, further turning of the locking mechanism 9 can be carried out such that the second side 34 moves along the spiral portion 12 until the second side 34 reaches the holding portion 19. FIG. 3b shows both the first side 32 and the second side 34 in the holding portion 19.

FIG. 2 shows one way to turn the locking mechanism 9. FIG. 2 shows a hot stick 38 operably engaging the engagement portion 22. The hot stick 38 may include a shaft 40, and engagement jaws 36. An operator which is distanced from the cover 44 can use the hot stick 38 to engage the engagement portion 22 by opening the engagement jaws 36 and closing them around the engagement portion 22. Then, the operator can turn the engagement jaws 36 such that this turns the engagement portion 22, which in turn causes the locking mechanism 9 to rotate. This rotation is what allows the locking mechanism 9 to lock the cover 44 in a closed position. Hot sticks 38 are known in the art and additional description is not necessary.

In an embodiment, as shown at FIGS. 2, 3a, and 4, the first side 32 includes a protrusion 46 which extends at least substantially around the opening 35 of the first side 32. The second side 34 may include a similar protrusion 47 surrounding the opening 37. The method of the present invention includes turning the locking mechanism 9 such that the second side 34 (in addition to the first side 32) moves along the spiral portion 12 until the second side 34 reaches the holding portion 19 such that the first side 32, the second side 34, and the protrusions 46 and 47 are all in the holding portion 19 and are subject to pressure in the holding portion 19. The pressure is exerted by the second end 18 and the supporting end 20 by deforming the protrusions 46 and 47 within the holding portion 19.

In an embodiment, the cover 44 substantially surrounds the electrical connector 29 (see FIG. 4) and the electrical connector 29 is operably connected to the electrical transmission conductor 26 and the distribution conductor 28. Although FIG. 3a does not show the electrical connector 29, the electrical transmission conductor 26, or the distribution conductor 28, these objects are shown at FIG. 4 in dotted lines to show where they would go if they were included at FIG. 3a.

Although FIGS. 3a and 4 show first side 32 and second side 34 adjacent to one another even if the locking mechanism 9 is not engaged to the first and second sides 32, 34, the first side 32 and the second side 34 may be spaced apart from one another and only connected via a cover end 30 prior to engagement with the locking mechanism 9. In such a case, the tip portion 10 can still enter the first side 32 and then the spiral 12 can enter the first side 32 and then the tip portion 10 can enter the second side 34 and then the spiral portion 12 can enter the second side 32. As stated above, as the locking mechanism 9 is rotated, the first and second sides 32, 34 can move along the spiral 12 in order to be accommodated in the holding portion 19, or the locking mechanism 9 can move such that the first and second sides 32, 34 end up in the holding portion 19. If the cover 44 is closed to begin with, it is possible for the tip portion 10 to enter into the first and second sides 32, 34 prior to the spiral portion 12 entering the cover 44, depending on the length of the tip portion 10 and the thickness of the first and second sides 32, 34, and the protrusions 46 and 47.

In yet another aspect, as shown at FIG. 2, the present invention is directed to a cover system 42 for the electrical connector 29 (shown at FIG. 4). The electrical connector 29 is operably connected to the electrical transmission conductor 26 and the distribution conductor 28 while in use. The system 42 includes the cover 44 for the electrical connector 29 and the locking mechanism 9 configured to lock the cover 44 around the electrical connector 29. For example, the system includes the cover 44 and the locking mechanism 9 locking the cover 44 as shown at FIG. 3b. The cover 44 includes the first side 32 and the second side 34, which are positioned to cover and protect the electrical connector 29. Also, the first side 32 and the second side 34 may be operably connected at the cover end 30. As stated above, the locking mechanism 9 includes the tip portion 10, the spiral portion 12, the holding portion 19, and the engagement portion 22. The tip portion 10 preferably has a smaller cross-sectional area than the spiral portion 12 and the engagement portion 22 is a widest portion of the locking mechanism 9.

The cover system 42 is designed such that the locking mechanism 9 is configured to operably engage the first side 32 and the second side 34 of the cover 44 through first and second openings 35, 37, respectively. In its locked position, the first and second openings 32, 34, are positioned on the holding portion 19. This can be seen at FIG. 3b with the conductors 26, 28 omitted for simplicity. The system 42 includes, on the first side 32 of the cover 44, the protrusions 46 and 47 which extend substantially around the first openings 35 and 37. When the system 42 is operated, the first side 32 (including the protrusion 46), and the second side 34, are under pressure while located on the engagement portion 19 of the locking mechanism 9. The pressure is generated by the protrusions 46 and 47 being squeezed between the supporting end 20 of engagement portion 22 and the second end 18 of the spiral portion 12 (see FIGS. 1a-1d).

The engagement portion 19 is designed such that it is approximately the same length (along the first axial direction) as the thickness (also in the first axial direction) of the combination of the first side 32, second side 34, and protrusion 46 to ensure that the cover 44 is held tight by the locking mechanism 9. It is possible for the engagement portion 19 to be a bit smaller (up to fifteen percent) as the combination of the thickness of the first side 32, the second side 34, and protrusion 46, when not under pressure, such that under pressure the first and second sides 32, 34 and the protrusion 46 are deformed at the engagement portion 19 in order to have approximately the same thickness as the length of the engagement portion 19. The cover 44, including the protrusions 46 and 47, are preferably made of a polymeric material (such as a type of plastic) due to the general lack of conductivity of polymeric materials.

The distance 13 between two adjacent groove walls 15 along the axial portion 16 (see FIG. 1a) is preferably at least twice as large as the thickness (in the first axial direction) of the first side 32 and the protrusion 46 combined in order to allow the first side 32 and the protrusion 46 to be able to be moved along the spiral 12. Preferably, distance 13 is between 200% and 225% of the thickness of the combined first side 32 and protrusion 46. The distance 13 may be greater if it is envisioned that the second side 34 will be moved along the spiral portion 12 while adjacent to the first side 32.

The present invention may be embodied in other specific forms without departing from the spirit or essential attributes thereof and accordingly, reference should be made to the appended claims rather than to the foregoing specification as indicating the scope of the invention.

We claim:

1. A cover assembly for surrounding a high-voltage electrical connector attached to multiple electrical conductors forming an electrically conductive path between the connector and the multiple electrical conductors, the cover assembly comprising:

a first cover side configured to receive at least a first portion of the high-voltage electrical connector attached to the multiple electrical conductors;

a second cover side configured to receive at least a second portion of the high-voltage electrical connector attached to the multiple electrical conductors, and having one end pivotably secured to one end the first cover side, such that when in a closed position the first and second cover sides form a hollow interior that receives the high-voltage electrical connector attached to the multiple electrical conductors solely to cover and protect the high-voltage electrical connector and the multiple electrical conductors attached to the high-voltage electrical connector; and a locking member configured to releasably lock the first cover side to the second cover side, the locking member including:

a spiral flange that extends at least once around at least a portion of an axial member;

a supporting member at a first end of the axial member; and an engagement member attached to the supporting member, the engagement member includes a ring-like member having an opening.

2. The cover assembly according to claim 1, wherein the axial member includes a holding portion, wherein a terminal end of the spiral flange defines a first end of the holding portion, and wherein the supporting member defines a second end of the holding portion.

3. The cover assembly according to claim 2, wherein the first end and the second end of the holding portion are configured to contact the first and second cover sides at least when the first and second cover sides are in a closed position.

4. The cover assembly according to claim 1, wherein the first cover side is joined to the second cover side by a cover end.

5. The cover assembly according to claim 4, wherein the first cover side includes a first aperture on an end of the first cover side opposite the cover end and the second cover side includes a second aperture on an end of the second cover side opposite the cover end, and wherein the locking member is interactive with the first aperture and the second aperture to releasably lock the first cover side to the second cover side.

6. The cover assembly according to claim 1, wherein the spiral flange ends proximate the supporting member or at the supporting member.

7. A cover assembly for surrounding a high-voltage electrical connector attached to multiple electrical conductors forming an electrically conductive path between the connector and the multiple electrical conductors, the cover assembly comprising:

an insulating cover having one end of a first side pivotably joined to one end of a second side, the first side having a first opening and the second side having a second opening, the first side being configured to receive at least a first portion of the high-voltage electrical connector attached to the multiple electrical conductors and the second side configured to receive at least a second portion of the high-voltage electrical connector attached to the multiple electrical conductors, such that when in a closed position the first and second sides form a hollow interior that receives the high-voltage electrical connector attached to the multiple electrical conductors solely to cover and protect the high-voltage electrical connector and the multiple electrical conductors attached to the high-voltage electrical connector; and a locking member interactive with the first opening and the second opening, the locking member including:

a spiral flange that extends at least once around at least a portion of an axial portion;

a supporting end at one end of the spiral flange; and an engagement member attached to the supporting member, the engagement member includes a ring-like member having an opening.

8. The cover assembly according to claim 7, wherein the axial portion includes a holding portion, wherein the spiral flange ends at a first end of the holding portion, and wherein a second end of the holding portion is proximate the supporting end or at the supporting end.

9. The cover assembly according to claim 8, wherein the first end and the second end of the holding portion are configured to contact the cover at least when the cover is in a closed position.

10. The cover assembly according to claim 7, wherein the first side is joined to the second side by a cover end.

11. The cover assembly according to claim 10, wherein the first opening is on an end of the first side opposite the cover end and the second opening is on an end of the second side opposite the cover end.

12. A cover assembly for surrounding a high-voltage electrical connector attached to multiple electrical conductors forming an electrically conductive path between the connector and the multiple electrical conductors, the cover assembly comprising:

an insulating cover having one end of a first side pivotably joined to one end of a second side, the first side having a first opening and the second side having a second opening, the first side being configured to receive at least a first portion of the high-voltage electrical connector attached to the multiple electrical conductors and the second side configured to receive at least a second portion of the high-voltage electrical connector attached to the multiple electrical conductors, such that when in a closed position the first and second sides form a hollow interior that receives the high-voltage electrical connector attached to the multiple electrical conductors solely to cover and protect the high-voltage electrical connector and the multiple electrical conductors attached to the high-voltage electrical connector; and a locking member interactive with the first opening and the second opening to releasably lock the first side to the second side, the locking member including:

an axial portion having a first end insertable into the first opening and the second opening when locking the first side to the second side;

a spiral flange that extends at least once around at least a portion of the axial portion;

a supporting end at a second end of the axial portion; and an engagement member attached to the supporting member, the engagement member includes a ring-like member having an opening.

13. The cover assembly according to claim 12, wherein the axial portion includes a holding portion, wherein the spiral flange ends at a first end of the holding portion, and wherein a second end of the holding portion is proximate the supporting end or at the supporting end.

14. The cover assembly according to claim 13, wherein the first end and the second end of the holding portion are configured to contact the cover at least when the cover is in a closed position.

15. The cover assembly according to claim 12, wherein the first side is joined to the second side by a cover end.

16. The cover assembly according to claim 15, wherein the first opening is on an end of the first side opposite the cover end and the second opening is on an end of the second side opposite the cover end.

17. A cover assembly for surrounding a high-voltage electrical connector attached to multiple electrical conductors forming an electrically conductive path between the connector and the multiple electrical conductors, the cover assembly comprising:

a first side having one end pivotably joined to one end of a second side, the first side has a first opening and the second side has a second opening, wherein the second opening aligns with the first opening when the first and second sides are in a closed position forming a hollow interior, the first side being configured to receive at least a first portion of the high-voltage electrical connector attached to the multiple electrical conductors and the second side configured to receive at least a second portion of the high-voltage electrical connector attached to the multiple electrical conductors, such that when in the closed position the hollow interior receives the high-voltage electrical connector attached to the multiple electrical conductors solely to cover and protect the high-voltage electrical connector and the multiple electrical conductors attached to the high-voltage electrical connector; and a locking member interactive with the first opening and the second opening, the locking member including:

an axial member having a first end insertable into the first opening and the second opening;

a spiral flange that extends at least once around at least a portion of the axial member;

a supporting member at a second end of the axial member; and an engagement member attached to the supporting member, the engagement member includes a ring-like member having an opening.

18. The cover assembly according to claim 17, wherein the locking member further includes a holding portion associated with the axial member, wherein a terminal end of the spiral flange defines a first end of the holding portion, and wherein the holding portion has a second end proximate the supporting member or at the supporting member.

19. The cover assembly according to claim 18, wherein the first end of the holding portion is configured to contact the first side and the second end of the holding portion is configured to contact the second side at least when the first and second sides are in the closed position.

20. The cover assembly according to claim 17, wherein the first side is joined to the second side by a cover end.

21. The cover assembly according to claim 20, wherein the first opening is on an end of the first side opposite the cover end and the second opening is on an end of the second side opposite the cover end.

22. A connector assembly for connecting multiple high-voltage electrical conductors and covering the high-voltage electrical conductors, the connector assembly comprising:

a high-voltage electrical connector; and a cover assembly for surrounding the high-voltage electrical connector when the high-voltage electrical connector is attached to the multiple electrical conductors so that an electrically conductive path is formed between the electrical connector and the multiple electrical conductors, the cover assembly including:

a first cover side configured to receive at least a first portion of the high-voltage electrical connector attached to the multiple electrical conductors;

a second cover side configured to receive at least a second portion of the high-voltage electrical connector attached to the multiple electrical conductors, and having one end pivotably secured to one end of the first cover side, such that when in a closed position the first and second cover sides form a hollow interior that receives the high-voltage electrical connector attached to the multiple electrical conductors solely to cover and protect the high-voltage electrical connector and the multiple electrical conductors attached to the high-voltage electrical connector; and a locking member configured to releasably lock the first cover side to the second cover side, the locking member including:

a spiral flange that extends at least once around at least a portion of an axial member;

a supporting member at a first end of the axial member; and an engagement member attached to the supporting member, the engagement member includes a ring-like member having an opening.

23. The connector assembly according to claim 22, wherein the axial member includes a holding portion, wherein a terminal end of the spiral flange defines a first end of the holding portion, and wherein the supporting member defines a second end of the holding portion.

24. The connector assembly according to claim 23, wherein the first end and the second end of the holding portion are configured to contact the first and second cover sides at least when the first and second cover sides are in a closed position.

25. The connector assembly according to claim 22, wherein the first cover side is joined to the second cover side by a cover end.

26. The connector assembly according to claim 25, wherein the first cover side includes a first aperture on an end of the first cover side opposite the cover end and the second cover side includes a second aperture on an end of the second cover side opposite the cover end, and wherein the locking member is interactive with the first aperture and the second aperture to releasably lock the first cover side to the second cover side.

27. The connector assembly according to claim 22, wherein the spiral flange ends proximate the supporting member or at the supporting member.

28. A connector assembly for connecting multiple high-voltage electrical conductors and covering the high-voltage electrical conductors, the connector assembly comprising:
  a high-voltage electrical connector; and
  a cover assembly for covering the electrical connector when the high-voltage electrical connector is attached to the multiple electrical conductors so that an electrically conductive path is formed between the high-voltage electrical connector and the multiple electrical conductors, the cover assembly including:
    an insulating cover having one end of a first side pivotably joined to one end of a second side, the first side having a first opening and the second side having a second opening, the first side being configured to receive at least a first portion of the high-voltage electrical connector attached to the multiple electrical conductors and the second side configured to receive at least a second portion of the high-voltage electrical connector attached to the multiple electrical conductors, such that when in a closed position the first and second sides form a hollow interior that receives the high-voltage electrical connector attached to the multiple electrical conductors solely to cover and protect the high-voltage electrical connector and the multiple electrical conductors attached to the high-voltage electrical connector; and
  a locking member interactive with the first opening and the second opening, the locking member including:
    a spiral flange that extends at least once around at least a portion of an axial portion;
    a supporting end at one end of the spiral flange; and
    an engagement member attached to the supporting member, the engagement member includes a ring-like member having an opening.

29. The connector assembly according to claim 28, wherein the axial portion includes a holding portion, wherein the spiral flange ends at a first end of the holding portion, and wherein a second end of the holding portion is proximate the supporting end or at the supporting end.

30. The connector assembly according to claim 29, wherein the first end and the second end of the holding portion are configured to contact the cover at least when the cover is in a closed position.

31. The connector assembly according to claim 28, wherein the first side is joined to the second side by a cover end.

32. The connector assembly according to claim 31, wherein the first opening is on an end of the first side opposite the cover end and the second opening is on an end of the second side opposite the cover end.

* * * * *